United States Patent [19]

Suzuki et al.

[11] 4,416,361

[45] Nov. 22, 1983

[54] FRICTION FACINGS REINFORCED WITH STITCHING

[75] Inventors: Kiyohisa Suzuki, Toyota; Yasunobu Yamamoto, Chiryu; Ryoichi Tomikawa, Toyota; Toshiaki Sakabe, Toyota; Hiroshi Ban, Toyota; Nobuyasu Ishida, Tokai, all of Japan

[73] Assignee: Aisin Seiki Co., Ltd., Kariya, Japan

[21] Appl. No.: 333,771

[22] Filed: Dec. 23, 1981

Related U.S. Application Data

[63] Continuation of Ser. No. 132,425, Mar. 21, 1980, abandoned.

[30] Foreign Application Priority Data

Mar. 30, 1979 [JP] Japan ................................. 54-38847

[51] Int. Cl.³ .............................................. F16D 69/02
[52] U.S. Cl. ................................................ 192/107 M
[58] Field of Search ............... 428/102, 289, 290, 300, 428/301, 367, 408; 192/107 M

[56] References Cited

U.S. PATENT DOCUMENTS

| | | | |
|---|---|---|---|
| 3,270,846 | 9/1966 | Arledter et al. | 192/107 M |
| 3,526,306 | 9/1970 | Bentz et al. | 192/107 M |
| 3,554,860 | 1/1971 | Lacroix | 192/107 M |
| 3,647,722 | 3/1972 | Albertson et al. | 192/107 M |
| 3,657,061 | 4/1972 | Carlson et al. | 192/107 M |
| 3,998,986 | 12/1976 | Williams | 428/102 |

*Primary Examiner*—Rodney H. Bonck
*Attorney, Agent, or Firm*—Oblon, Fisher, Spivak, McClelland & Maier

[57] ABSTRACT

Friction facings comprising a non-woven fibrous lamina reinforced with stitching, and impregnated with a curable binder have improved resistance to delamination.

9 Claims, No Drawings

FRICTION FACINGS REINFORCED WITH STITCHING

This is a continuation of application Ser. No. 132,425, filed Mar. 21, 1980 and now abandoned.

BACKGROUND OF THE INVENTION

1. Field of the Invention:

This invention relates to friction facings for friction clutches, brakes and the like, and more particularly to such friction facings which are made from non-woven fabrics or paper.

2. Description of the Prior Art:

Friction facings for friction clutches, brake linings and the like are frequently composed of a relatively thin layer of non-woven fabric or paper prepared by standard papermaking techniques using a paper making machine. The fibrous lamina is then impregnated with a curable binder composition, formed and cured using heat and pressure, and finally polished, thereby to prepare a finished friction facing. Friction facings prepared in this way are generally used in the clutch facings and brake linings of motor vehicles.

However, the friction facings prepared by the hitherto known process have been found to have certain drawbacks. Fibrous laminae prepared by the usual papermaking techniques have their fibers oriented predominantely in the plane of the lamina. Thus, the laminae containing fibers so oriented have little strength in a direction perpendicular to the plane of the lamina, and they are prone to separate in that direction, producing delamination of the friction facing. This is evidently an undesirable property of such friction facings. Thus, impregnated friction facings prepared by the hitherto conventional process are deficient in their properties.

Hence, a need has continued to exist for an improved friction facing which is not subject to the problems of delamination.

SUMMARY OF THE INVENTION

Accordingly, it is an object of this invention to provide friction facings for clutches, brake linings, and the like having improved resistance to delamination.

Other objects will become apparent from the description of the invention which follows.

Briefly, these objects of the invention are attained by providing friction facings which are fibrous laminae reinforced by stitching the laminae. The stitching is performed in the conventional manner by passing a continuous thread through the lamina in a direction generally perpendicular to the plane of the lamina and taking enough stitches to provide the needed reinforcement of the fibrous lamina. The fibrous laminae so prepared are then impregnated with a curable binder and cured by the application of heat and pressure in the usual manner to prepare the finished friction facings.

DETAILED DESCRIPTION OF THE PREFERRED EMBODIMENTS

The fibers used in preparing the friction facings of this invention may be any of the conventional fibers used for this purpose. The fibers may be either inorganic fibers or organic fibers. Suitable organic fibers include paper fibers, phenolic fibers, carbon fibers, cotton fibers, hemp fibers and various heat resistant organic fibers which are partially carbonized by heating at a temperature of 400°–600° C. in an inert gas atmosphere. It is preferable that the organic fibers such as carbon fibers, phenolic fibers, and heat resistant fibers do not exhibit any loss in weight during heating at a temperature of about 200° C. in air. Suitable inorganic fibers include asbestos fibers, glass fibers, ceramic fibers, and the like.

Mixtures containing more than one type of fiber may be used in the friction facings of the invention. It is preferred to choose at least one organic fiber and one inorganic fiber, because the organic and inorganic fibers have complementary properties.

According to the invention, a fibrous lamina is prepared in the conventional manner. The lamina so prepared is then reinforced by stitching in the conventional manner in which a lamina is stitched. While any procedure may be used for stitching the friction facing, it is preferred to take stitches of a constant size. In this way, the vertical reinforcing part of the stitching thread will pass through the lamina at about equal intervals. Any sewing machine may be used such as an industrial sewing machine, a home sewing machine, a quilting machine, and an air jet. The thread used for the reinforcing stitching may be any suitable type and size of thread. The particular properties desired will depend upon the size and intended use of the friction facing. Metal wire thread may also be used.

The diameter of the thread used for stitching the friction facings of this invention is preferably less than 600 denier and most preferably between 50 and 200 denier. Metallic thread used for reinforcing the friction facings of the invention should be 0.1–0.3 mm in diameter.

After stitching of the laminar fibrous sheet, it is impregnated in the conventional manner with a curable organic binder dissolved in a suitable volatile solvent. Suitable binders include phenolic resins, melamine resins, polyamide resins, cresol resins and rubber. The impregnated fibrous layers are then formed and cured using heat and pressure to prepare a finished friction facing. When rubber is used as the binder, the material may be cured at room temperature by incorporation of a suitable vulcanizing agent.

Having generally described the invention, a more complete understanding can be obtained by reference to certain specific examples, which are provided herein for purposes of illustration only and are not intended to be limiting unless otherwise specified.

EXAMPLE 1

A fiber mixture was prepared comprising 50% glass fibers and 50% paper fibers. The fibers were thoroughly mixed using a conventional mixer. A lamina of 1.5 mm thickness was prepared from the fiber mixture using a conventional papermaking machine. The lamina so prepared was then stitched using an industrial sewing machine with both upper and lower threads being made of cotton. The stitching had a constant pitch of 5 mm and the rows of stitches were 4 mm apart.

The stitched lamina so prepared was then impregnated with a solution of a curable phenolic resin in an organic solvent. The impregnated lamina was then formed and cured in a compression molding machine under heat and pressure. The cured friction facing was then trimmed around the circumference to prepare a finished product.

EXAMPLE 2

A non-woven fabric lamina, 1.5 mm thick, was prepared by the procedure of Example 1 using phenolic fibers. The lamina so prepared was stitched with an industrial sewing machine using standard No. 20 rayon thread for both upper and lower threads. The stitching had a constant pitch of 5 mm and the rows of stitches were 6 mm apart. The stitched lamina so obtained was impregnated and cured as in Example 1 using a rubber latex.

EXAMPLE 3

A fibrous lamina, 1.5 mm thick, was prepared by the procedure of Example 1 using a mixture of 80% by weight of glass fibers and 20% by weight of paper fibers. The lamina was stitched with an industrial sewing machine using a rayon upper thread and a lower thread of brass wire of 0.15 mm diameter. The stitching had a constant pitch of 4 mm and the rows of stitches were 5 mm apart.

The lamina was impregnated with a solution of a phenolic resin and cured as in Example 1.

COMPARATIVE EXAMPLES 1-3

Comparative friction facings were prepared by the procedures of each of Examples 1-3, except that the laminae were not stitched.

The friction facings prepared in Examples 1-3 and Comparative Examples 1-3 were tested and compared as to the properties of peel strength, heat conductivity, and wear rate. Peel strength was measured according to JIS K6829, using a square test sample 25 mm on a side and a tensile speed of 2 mm/min. The heat conductivity was measured by the procedure of JIS R2618. The wear rate was measured using a Greening Associates, Inc. friction materials testing machine under conditions of face pressure of 50 psi and a rotary speed of 1000 r.p.m.

The results of the comparative tests are presented in Table 1.

TABLE 1

| Friction facing | Peel strength (kg) | Heat conductivity (Kcal/m.h.C) | Wear rate ($\times 10^{-6}$ mm/Kgm) at 100° C. | Wear rate ($\times 10^{-6}$ mm/Kgm) at 250° C. |
| --- | --- | --- | --- | --- |
| Example 1 | 50 | 0.110 | 0.485 | 2.600 |
| Comparative Ex. 1 | 20 | 0.105 | 0.560 | 2.500 |
| Example 2 | 30 | 0.085 | 0.260 | 1.960 |
| Comparative Ex. 2 | 15 | 0.090 | 0.280 | 1.880 |
| Example 3 | 60 | 0.154 | 0.273 | 1.860 |
| Comparative Ex. 3 | 20 | 0.113 | 0.580 | 2.500 |

The friction facings prepared according to this invention are seen to be superior in peel strength to the comparative facings. Indeed, no problems were encountered with delamination in the preparation of the stitched facings of this invention in comparison with the unstitched facings of the comparative Examples. It may also be seen that the friction properties of the facings of this invention are very good and in every way comparable with the properties of the comparative facings.

Having now fully described the invention, it will be apparent to one of ordinary skill in the art that many changes and modifications can be made thereto without departing from the spirit or scope of the invention as set forth herein.

What is claimed as new and intended to be secured by Letters Patent of the United States is :

1. A friction facing comprising a non-woven fibrous lamina, reinforced with stitches of a continuous brass wire, which has been impregnated with a binder, wherein said friction facing is attached to a clutch mechanism.

2. The friction facing of claim 1, wherein said brass wire has a diameter between 0.1 and 0.3 mm.

3. The friction facing of claim 1, wherein said fibrous lamina is prepared on a paper making machine.

4. The friction facing of claim 3, wherein said fibrous lamina contains organic and inorganic fibers.

5. The friction facing of claim 4, wherein said fibers are selected from the group consisting of paper fibers, phenolic fibers, carbon fibers, cotton fibers, hemp fibers, and heat resistant organic fibers.

6. The friction facing of claim 5, wherein said heat resistant organic fiber is an organic fiber which has been heat treated in an inert gas at a temperature of 400° to 600° C. whereby it becomes partially carbonized.

7. The friction facing of claim 4, wherein said inorganic fiber is selected from the group consisting of asbestos fibers, glass fibers, and ceramic fibers.

8. The friction material of claim 1, wherein said fibrous lamina is a non-woven fabric.

9. The friction facing of claim 1, wherein said fibrous lamina is a paper.

* * * * *